United States Patent
Wijaya et al.

(10) Patent No.: US 9,058,076 B2
(45) Date of Patent: *Jun. 16, 2015

(54) TOUCH PANEL

(71) Applicant: AU Optronics Corporation, Hsin-Chu (TW)

(72) Inventors: Martinus Tony Wijaya, Hsin-Chu (TW); Mei-Sheng Ma, Hsin-Chu (TW); Yuan-Chun Wu, Hsin-Chu (TW); Hsin-Hung Lee, Hsin-Chu (TW); Kuo-Hsing Cheng, Hsin-Chu (TW); Han Ping Kuo, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/316,888

(22) Filed: Jun. 27, 2014

(65) Prior Publication Data
US 2014/0307185 A1    Oct. 16, 2014

Related U.S. Application Data

(63) Continuation of application No. 12/436,246, filed on May 6, 2009, now Pat. No. 8,803,815.

(30) Foreign Application Priority Data

May 9, 2008  (TW) .............................. 97117152 A

(51) Int. Cl.
G06F 3/041    (2006.01)
G06F 3/044    (2006.01)

(52) U.S. Cl.
CPC .... G06F 3/0412 (2013.01); G06F 2203/04103 (2013.01); G06F 3/041 (2013.01); G06F 3/0416 (2013.01); G06F 3/044 (2013.01)

(58) Field of Classification Search
CPC ................... G06F 3/0412; G06F 2203/04103; G06F 3/041; G06F 3/0416
USPC .................. 345/173; 178/18.01, 18.06, 18.09
See application file for complete search history.

(56) References Cited

U.S. PATENT DOCUMENTS 6,519,021 B1 *  2/2003  Aruga ........................... 349/152
6,771,327 B2    8/2004  Sekiguchi
(Continued)

FOREIGN PATENT DOCUMENTS

TW          200638108          11/2006

OTHER PUBLICATIONS

English translation of abstract of TW 200638108.
(Continued)

Primary Examiner — Jason Mandeville
(74) Attorney, Agent, or Firm — McClure, Qualey & Rodack, LLP

(57) ABSTRACT

The present invention provides a touch panel used in a display device. The touch panel of the present invention is configured to display images and to receive as well as to process instructions inputted by user's touches. A display substrate partially overlaps with an image driving circuit substrate of the touch panel. A touch sensing circuit is disposed on the inner side of the display substrate. A touch sensing processor is disposed on the inner side of a touch sensing circuit and is also electrically coupled to the touch sensing circuit. Consequently, the thickness of the touch panel as well as the overall thickness of the display device is reduced.

15 Claims, 4 Drawing Sheets

(56) References Cited

U.S. PATENT DOCUMENTS

| | | |
|---|---|---|
| 6,963,385 B2 | 11/2005 | Aruga et al. |
| 6,972,966 B1 | 12/2005 | Oishi et al. |
| 7,019,809 B2 | 3/2006 | Sekiguchi |
| 7,180,505 B2 | 2/2007 | Oh et al. |
| 7,196,695 B2 | 3/2007 | Lin |
| 7,633,484 B2 | 12/2009 | Ito |
| 7,728,918 B2 | 6/2010 | Sakurai |
| 7,956,939 B2 | 6/2011 | Kubota et al. |
| 8,072,765 B2 | 12/2011 | Yumoto et al. |
| 8,111,248 B2 * | 2/2012 | Lee et al. ............... 345/174 |
| 8,243,027 B2 | 8/2012 | Hotelling et al. |
| 8,803,815 B2 * | 8/2014 | Wijaya et al. ............ 345/173 |
| 2001/0020985 A1 | 9/2001 | Hinata |
| 2002/0000979 A1 | 1/2002 | Furuhashi et al. |
| 2002/0054261 A1 | 5/2002 | Sekiguchi |
| 2002/0149074 A1 | 10/2002 | Imaeda |
| 2005/0099402 A1 | 5/2005 | Nakanishi et al. |
| 2005/0179668 A1 * | 8/2005 | Edwards ............... 345/173 |
| 2005/0280635 A1 | 12/2005 | Hinata |
| 2007/0030242 A1 | 2/2007 | Ito |
| 2008/0062139 A1 | 3/2008 | Hotelling et al. |
| 2008/0150901 A1 | 6/2008 | Lowles et al. |
| 2008/0309635 A1 | 12/2008 | Matsuo |
| 2009/0107736 A1 | 4/2009 | Ben-Eliyahu et al. |
| 2009/0122021 A1 | 5/2009 | Liu et al. |

OTHER PUBLICATIONS

Taiwan Office Action dated Jan. 3, 2012.

* cited by examiner

TOUCH PANEL

BACKGROUND OF THE INVENTION

1. Field of the Invention

This invention relates to a touch panel and more specifically to an embedded touch panel in which a touch sensing circuit is integrated into the touch panel.

2. Description of the Prior Art

In recent years, flat display devices have become the mainstream in various types of display devices. For instance, the home televisions, monitors of personal computers and laptop computers, mobile phones, and display cameras are electronic products which extensively incorporate the flat display devices. As consumers are increasingly demanding for electronic products with user friendliness, pithy appearance, and multi-functionality, the flat display device with touch panel function is thus gradually becoming the mainstream in various types of flat display devices.

Reducing the thickness of the touch panel of the flat display device has always been one of the main objectives of the present flat display device industry. However, the thickness of a conventional touch panel is still not ideal according to the demands of the consumers. At present, a conventional touch panel mainly includes a display substrate and an image driving circuit substrate. Thus the arrangement of the display substrate to reduce the overall thickness of the touch panel has become an important issue in the present flat display device industry.

SUMMARY OF THE INVENTION

It is an object of the present invention to provide a touch panel having a touch sensing circuit integrated with a display substrate to reduce the overall thickness.

In order to reduce the thickness of the touch panel, the touch sensing circuit for sensing user's touches is disposed on an inner side of a display substrate. The display substrate partially overlaps with an image driving circuit substrate, and a touch sensing processor is disposed on the inner side of the display substrate. The touch sensing processor is electrically connected to the touch sensing circuit. In this way, the touch sensing processor is disposed on a side of the display substrate different from the polarizer layer but on a same side as the liquid crystal layer, and thus the overall thickness of touch panel can be reduced.

DETAILED DESCRIPTION OF THE PREFERRED EMBODIMENT

The present invention provides a touch panel for a display device to display images, to receive and to process instructions inputted by user's touches. The touch panel of the present invention can be used in a thin-film transistor liquid crystal display (TFT LCD) or other types of displays, such as organic light emitting diode (OLED) display. The touch panel preferably includes a capacitive touch sensing circuit. However, in different embodiments, the touch panel can includes other types or other forms of touch panels, such as resistive touch panel, surface acoustic wave touch panel, or optical imaging touch panel. Furthermore, the touch panel can include a single touch panel or a multi-touch panel.

Figure 1:
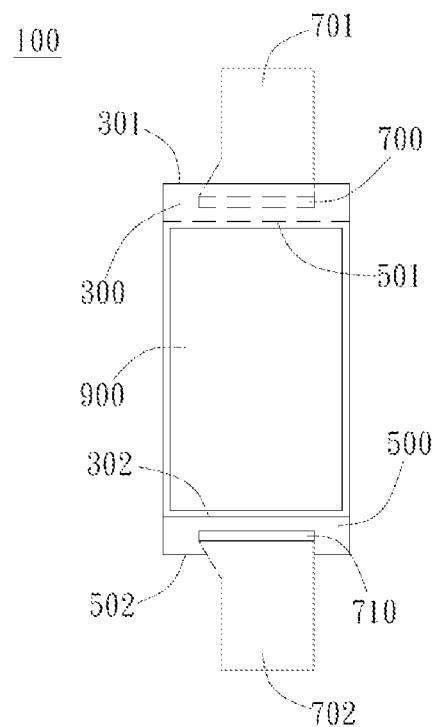
FIG. 1 is a top view of a preferred embodiment of a touch panel of the present invention.
Figure 2:
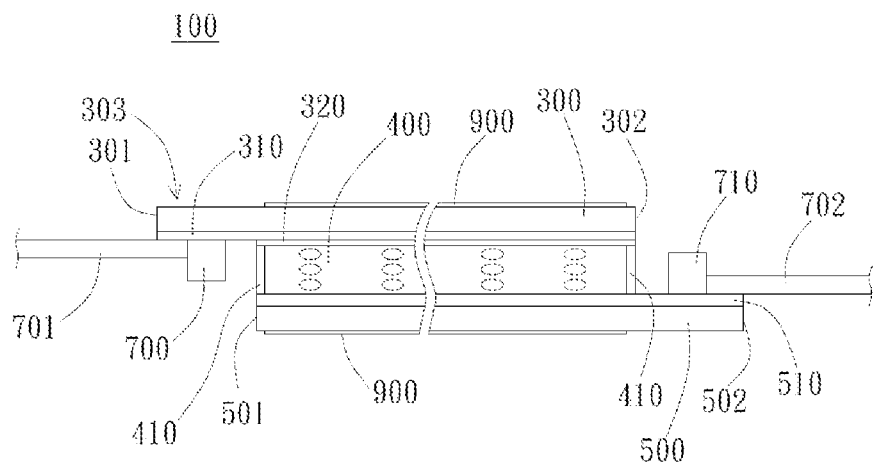
FIG. 2 is a schematic view of the touch panel illustrated in FIG. 1, wherein the touch panel of the present embodiment is a liquid crystal touch panel.

FIG. 1 and FIG. 2 illustrate a touch panel 100 of a preferred embodiment of the present invention. The touch panel 100 of the present embodiment is a liquid crystal touch panel used in a liquid crystal display (LCD). The touch panel 100 includes a display substrate 300, an image driving circuit substrate 500, and a pair of polarizer layers 900. In the present embodiment, the display substrates 300, the image driving circuit substrate 500, and the polarizer layer 900 are in a rectangular shape, but are not limited thereto. In other embodiments, the display substrate 300, the image driving circuit substrate 500, and the polarizer layer 900 can be in a square shape or other suitable shapes.

As shown in FIG. 1 and FIG. 2, the display substrate 300 is disposed over the image driving circuit substrate 500 and overlaps with a portion of the image driving circuit substrate 500. The display substrate 300 has a protruding part 303 protruding beyond a non-circuit end 501. The display substrate 300 includes a first end 301 and a second end 302. In the present embodiment, the first end 301 and the second end 302 are opposite each other on the shorter sides of the display substrate 300, but are not limited thereto. In other embodiments, the first end 301 and the second end 302 can be adjacent each other. The image driving circuit substrate 500 includes the non-circuit end 501 and a circuit end 502, wherein the non-circuit end 501 and the circuit end 502 are on shorter sides of the image driving circuit substrate 500, but are not limited thereto. In other embodiments, the non-circuit end 501 and the circuit end 502 can be two adjacent ends of the image driving circuit substrate 500 or any two ends of the image driving circuit substrate 500. As shown in FIG. 1 and FIG. 2, in the present embodiment, the non-circuit end 501 is situated below the display substrate 300. A touch sensing processor 700 is disposed on the protruding part 303 and an inner side of the display substrate 300 near the first end 301 and is exposed outside the non-circuit end 501 of the image driving circuit substrate 500. An image driving element 710 is disposed on an upper surface of the image driving circuit substrate 500 near the circuit end 502 and is exposed outside the second end 302 of the display substrate 300. Furthermore, the touch sensing processor 700 and the image driving element 710 are preferably formed by a chip on glass packaging process, but is not limited thereto. The touch sensing processor 700 and the image driving element 710 can be formed by a chip on film packaging process or other suitable integrated circuit packaging processes. The polarizer layer 900 is disposed on an outer side of the display substrate 300, wherein the polarizer layer 900 is preferably disposed on an active area between the second end 302 of the display substrate 300 and the non-circuit end 501 of the image driving circuit substrate 500, but is not limited thereto.

As shown in FIG. 1 and FIG. 2, a touch sensing circuit 310 is disposed on the inner side of the display substrate 300 and overhangs the non-circuit end 501. The touch sensing circuit 310 is configured to detect the user's touch and to output corresponding touch signals. The touch sensing processor 700 is disposed on the inner side of the touch sensing circuit 310 near the first end 301 and is exposed outside near the non-circuit end 501 of the image driving circuit substrate 500. The touch sensing processor 700 is electrically connected to the touch sensing circuit 310 for processing the touch signals to calculate an user's touch position according to the touch signals, and to output a position signal corresponding to the user's touch position. A position signal transmission module 701 is disposed on the inner side of the touch sensing circuit 310 and overhangs the first end 301. The position signal transmission module 701 is also electrically connected to the touch sensing processor 700 for receiving and transmitting the position signal. The position signal transmission module 701 is preferably a flexible printed circuit, but is not limited thereto. The position signal transmission module 701 can be a flexible flat cable or other suitable signal transmission lines. Furthermore, a color filter 320 is disposed on the inner side of the display substrate 300 and preferably on the touch sensing circuit 310, but is not limited thereto. The color filter 320 can be disposed between the display substrate 300 and the touch sensing circuit 310 or other suitable positions.

As shown in FIG. 2, in the present embodiment, the touch panel 100 further includes a liquid crystal layer 400 disposed between the display substrate 300 and the image driving circuit substrate 500. The liquid crystal layer 400 processes the light emitted by a backlight source (not illustrated). A plurality of spacers (not illustrated) are disposed in the liquid crystal layer 400 to maintain a certain distance between the display substrate 300 and the image driving circuit substrate 500 and to accordingly maintain the thickness of the liquid crystal layer 400. Furthermore, a plurality of sealants 410 are disposed to enclose the liquid crystal layer 400 and to isolate the liquid crystal layer 400 from external environment. An image driving circuit 510 is disposed on the image driving circuit substrate 500 for controlling the twist of liquid crystal molecules in the liquid crystal layer 400. The image driving circuit 510 of the present embodiment includes a thin-film transistor (TFT) matrix and gate lines as well as data lines electrically connected to the thin-film transistor matrix, but is not limited thereto. The image driving circuit 510 can includes other electrical circuits for controlling the twist of liquid crystal molecules of the liquid crystal layer 400. The image driving element 710 is electrically connected to the image driving circuit 510 for receiving a driving signal from an image signal transmission module 702 and controlling the image driving circuit 510 according to the received driving signal. The image signal transmission module 702 is disposed on the image driving circuit substrate 500 and overhangs from the circuit end 502. The image signal transmission module 702 is electrically connected to the image driving element 710 for receiving the image driving signals and transmitting the image driving signals to the image driving element 710. The image signal transmission module 702 is preferably a flexible printed circuit (FPC), but is not limited thereto. The image signal transmission module 702 can be a flexible flat cable (FFC) or other suitable transmission lines.

Figure 3:
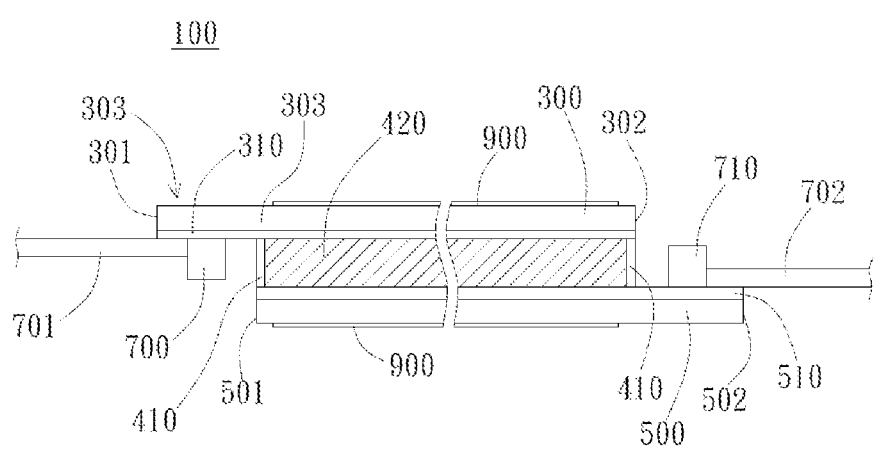
FIG. 3 is a schematic view of another preferred embodiment of a touch panel of the present invention, wherein the touch panel of the present embodiment is an organic light emitting diode (OLED) touch panel.

FIG. 3 is a schematic view of another preferred embodiment of the touch panel 100, wherein the touch panel 100 of the present embodiment is an organic light emitting diode touch panel. The touch panel 100 of the present embodiment does not include the color filter layer 320 illustrated in FIG. 2. The liquid crystal layer 400 illustrated in FIG. 2 is replaced by an organic light emitting diode layer 420. Nonetheless, the touch panel 100 of the present embodiment remains substantially the same as the touch panel described in the previous embodiments in structure. The touch sensing circuit 310 is disposed on the protruding part 303 and the inner side of the display substrate 300 and extends over the non-circuit end 501. The touch sensing circuit 310 detects the user's touch position and outputs a corresponding touch signal. The touch sensing processor 700 is disposed on the inner side of the display substrate 300 near the first end 301. The touch sensing processor 700 is exposed outside the image driving circuit substrate 500 and is located close to the non-circuit end 501. The touch sensing processor 700 is electrically connected to the touch sensing circuit 310, for receiving and processing the touch signal from the touch sensing circuit 310. The touch sensing processor 700 then calculates the user's touch position and outputs a corresponding position signal. Furthermore, the position signal transmission module 701 is disposed on the inner side of the touch sensing circuit 310 and overhangs the first end 301. The position signal transmission module 701 is electrically connected to the touch sensing processor 700 for receiving and transmitting the position signal.

As shown in FIG. 3, the image driving circuit 510 is disposed on the image driving circuit substrate 500 for controlling the organic light emitting diode layer 420 to output lights of different wavelengths. The image driving element 710 is electrically connected to the image driving circuit 510 for receiving the driving signal and controlling the image driving circuit 510 according to the received driving signal. The image signal transmission module 702 is disposed on the image driving circuit substrate 500 and overhangs the circuit end 502. The image signal transmission module 702 is then electrically connected to the image driving element 710 for receiving the image driving signal and then transmitting the image driving signal to the image driving element 710. A pair of polarizer layers 900 are disposed over the display substrate 300 and below the image driving circuit substrate 500 respectively. The polarizer layers 900 are preferably disposed in the area between the second end 302 of the display substrate 300 and the non-circuit end 501 of the image driving circuit substrate 500, but are not limited thereto.

Figure 4:
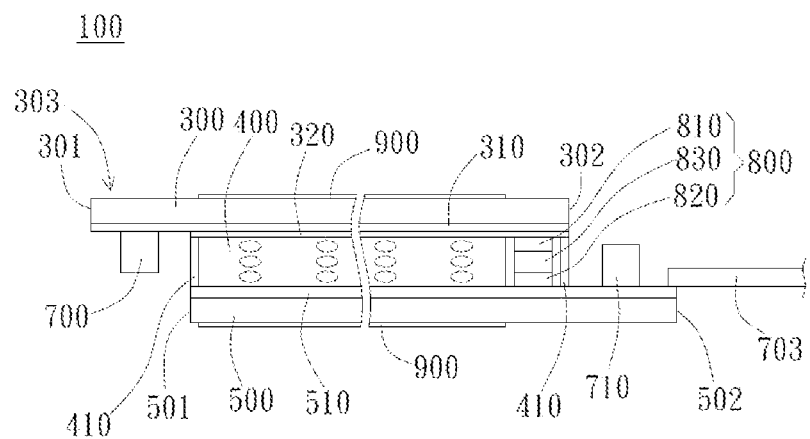
FIG. 4 is a schematic view of yet another preferred embodiment of a touch panel of the present invention, wherein the touch panel of the present embodiment is a liquid crystal touch panel, and a position signal and a driving signal are received and transmitted by an integrated signal transmission module.

FIG. 4 is a schematic view illustrating yet another embodiment of the touch panel 100. The touch panel 100 of the present embodiment is a liquid crystal touch panel 100. The touch panel 100 of the present embodiment has an integrated signal transmission module 703 for receiving and transmitting electrical signals. The integrated signal transmission module 703 is preferably a flexible printed circuit, but is not limited thereto. The integrated signal transmission module 703 can be a flexible flat cable or other suitable signal transmission lines. The touch panel 100 further includes a transmission module 800 electrically connected to the touch sensing processor 700 for receiving and transmitting a position signal from the touch sensing processor 700. Other than the integrated signal transmission module 703 and the transmission module 800 mentioned above, the touch panel 100 of the present embodiment is substantially identical to the touch panel described above.

As shown in FIG. 4, the touch sensing circuit 310 is disposed on the inner side of the display substrate 300 and overhangs the non-circuit end 501, for detecting the user's touch position and outputting a corresponding touch signal.

The display substrate 300 has the protruding part 303 protruding beyond the non-circuit end 501. The touch sensing processor 700 is disposed on the protruding part 303 and the inner side of the display substrate 300 near the first end 301 and exposed outside the image driving circuit substrate 500 close to the non-circuit end 501. The touch sensing processor 700 is electrically connected to the touch sensing circuit 310 for receiving and processing the touch signal, calculating the user's touch position according to the touch signal, and then outputting a position signal corresponding to the user's touch position. Furthermore, the color filter layer 320 is disposed on the inner side of the touch sensing circuit 310, but is not limited thereto. The color filter layer 320 can be disposed between the display substrate 300 and the touch sensing circuit 310 or other suitable locations.

As it can be seen from FIG. 4, the transmission module 800 is disposed between the display substrate 300 and the image driving circuit substrate 500. The transmission module 800 is electrically connected to the touch sensing circuit 700 via a circuit (not illustrated) on the display substrate 300. In other words, the circuit (not illustrated) on the display substrate 300 is electrically connected to both the touch sensing circuit 700 and the transmission module 800. The transmission module 800 receives the position signal from the touch sensing processor 700 and then transmits the position signal to the integrated transmission module 703, via the image driving circuit 510. In the present embodiment, the transmission module 800 is located between the liquid crystal layer 400 and the sealant 410, but is not limited thereto. The transmission module 800 can be disposed within the sealant 410, disposed outside the sealant 410, or at other suitable locations. Furthermore, the transmission module 800 is preferably disposed outside the coverage of the pair of polarizer layers 900, but is not limited thereto. The transmission module 800 includes a first conduction pad 810, a second conduction pad 820, and a conduction medium 830. The first conduction pad 810 is electrically connected to the touch sensing processor 700, and the second conduction pad 820 is electrically connected to the integrated transmission module 703. The conduction medium 830 is located between the first conduction pad 810 and the second conduction pad 820. Two ends of the conduction medium 830 are electrically connected to the first conduction pad 810 and the second conduction pad 820 respectively. The integrated signal transmission module 703 is used to simultaneously receive and transmit the position signal as well as the driving signal. In other words, the integrated signal transmission module 703 incorporates functions of the position signal transmission module and the image signal transmission module described above, and thus, the position signal transmission module and the image signal transmission module are integrated at one of four sides of the touch panel 100.

Figure 5:
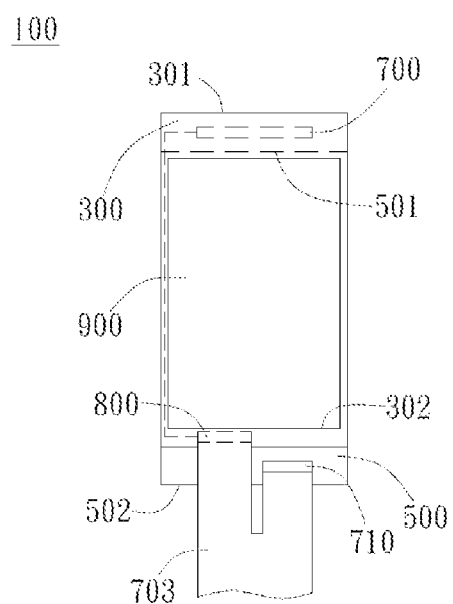
FIG. 5 is a top view of the touch panel illustrated in FIG. 4, wherein the transmission module is electrically connected to the touch sensing processor via circuits disposed on the display substrate.

As shown in FIG. 5, the touch sensing processor 700 is electrically connected to a circuit on the display substrate 300. The circuit goes around the active area and is then electrically connected to the transmission module 800 disposed on the inner side of the display substrate 300. The circuit (not illustrated) on the display substrate 300 transmits a position signal from the touch sensing processor 700 to the transmission module 800, but is not limited thereto. The above-mentioned circuit can be electrically connected to the periphery of the display substrate 300 or disposed on other suitable locations. As shown in FIG. 5, the transmission module 800 and the image driving element 710 are both electrically connected to the integrated signal transmission module 703. Thus the integrated signal transmission module 703 can simultaneously receive the position signals as well as the driving signals.

Figure 6:
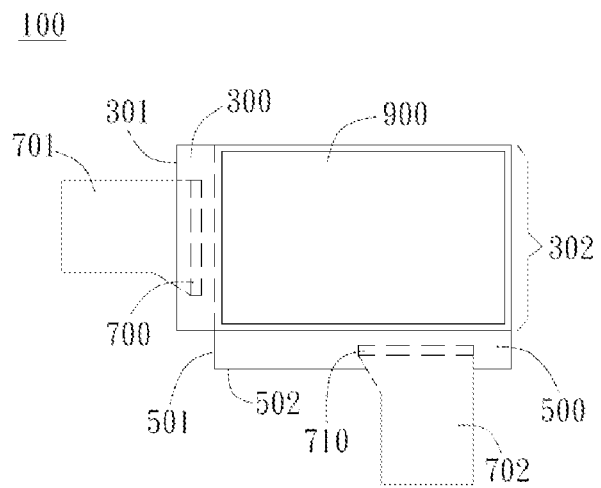
FIG. 6 illustrates a modification of the touch panel illustrated in FIG. 1, wherein the display substrate and the image driving circuit substrate are arranged in an L shape.
Figure 7:
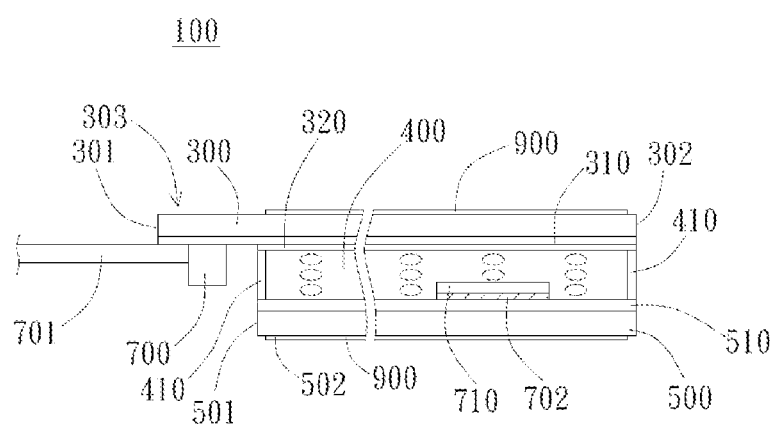
FIG. 7 is a side view of the touch panel illustrated in FIG. 6.

FIG. 6 and FIG. 7 illustrate a modification of FIG. 1. The display substrate 300 is disposed over the image driving circuit substrate 500 and partially overlaps with the surface of the image driving circuit substrate 500. The display substrate 300 has the protruding part 303 protruding beyond the non-circuit end 501. In the present embodiment, the circuit end 502 and the non-circuit end 501 are disposed on two adjacent sides of the image driving circuit substrate 500. In other words, in the present embodiment, the image driving circuit substrate 500 is in a rectangular shape, and thus, one of the circuit end 502 and the non-circuit end 501 of the image driving circuit substrate 500 is on a longer side while the other is on a shorter side. The touch sensing processor 700 is disposed on the protruding part 303 and the inner side of the display substrate 300 near the first end 301. The touch sensing processor 700 is also exposed outside the image driving circuit substrate 500 and is disposed close to the non-circuit end 501. In other words, the touch sensing processor 700 and the image driving circuit substrate 500 are located at the same side of the display substrate 300. The touch sensing processor 700 is also electrically connected to an image driving circuit (not illustrated). The image driving element 710 is disposed on the image driving circuit substrate 500 near the circuit end 502. The image driving element 710 is exposed outside the display substrate 300 close to the second end 302. The image driving element 710 is also electrically connected to the image driving circuit (not illustrated). The polarizer layer 900 is disposed on a part of the display substrate 300 between the second end 302 and the non-circuit end 501. The polarizer layer 900 is preferably disposed on the active area between the second end 302 of the display substrate 300 and the non-circuit end 501 of the image driving circuit substrate 500, but is not limited thereto. Nonetheless, the structure of the touch panel 100 illustrated in FIG. 6 and in FIG. 7 is substantially the same as the touch panels described above.

The above is a detailed description of the particular embodiment of the invention which is not intended to limit the invention to the embodiment described. It is recognized that modifications within the scope of the invention will occur to a person skilled in the art. Such modifications and equivalents of the invention are intended for inclusion within the scope of this invention.

What is claimed is:

1. A touch panel, comprising:
    an image driving circuit substrate, having a circuit end and a non-circuit end, wherein the circuit end and the non-circuit end are adjacent to each other and are arranged in an L shape at adjacent edges of the image driving circuit substrate, and an image driving element is disposed on an inner surface of the image driving circuit substrate at the circuit end for controlling an image driving circuit;
    a display substrate, disposed over the image driving circuit substrate to partially overlap with the image driving circuit substrate and expose the circuit end of the image driving circuit substrate, the display substrate having a first end corresponding to the non-circuit end and overhanging the non-circuit end, and a second end corresponding to an end opposite to the non-circuit end, wherein the first end and the second end are opposite to each other at opposing ends of the display substrate, the display substrate having a protruding part corresponding to the first end protruding beyond the non-circuit end, and the image driving circuit substrate having a protruding part corresponding to the circuit end protruding from one end adjacent to the second end;
    a liquid crystal layer disposed between the image driving circuit substrate and the display substrate wherein an end of the liquid crystal layer is aligned with the non-circuit end and another end of the liquid crystal layer is aligned with the second end;

a touch sensing circuit disposed on an inner surface of the display substrate to coincide with the first end and the second end of the display substrate and disposed between the liquid crystal layer and the display substrate; and a touch sensing processor electrically connected to the touch sensing circuit, wherein the touch sensing processor is disposed on the protruding part of the display substrate and an inner surface of the touch sensing circuit.

2. The touch panel of claim 1, further comprising a color filter layer disposed on the inner surface of the display substrate, the touch sensing circuit is disposed between the color filter layer and the display substrate.

3. The touch panel of claim 1, wherein the touch sensing circuit comprises a capacitive touch sensing circuit, a resistive touch sensing circuit, an surface acoustic wave touch sensing circuit, or an infrared touch sensing circuit.

4. The touch panel of claim 1, further comprising a position signal transmission module electrically connected to the touch sensing processor, the position signal transmission module receiving and transmitting a position signal from the touch sensing processor, wherein the position signal transmission module overhanges the display substrate.

5. The touch panel of claim 1, wherein the image driving element is electrically connected with the image driving circuit substrate, the circuit end overhangs one end adjacent to the second end, and the image driving element is disposed on the image driving circuit substrate near the circuit end.

6. The touch panel of claim 5, wherein the image driving circuit substrate has the image driving circuit disposed thereon and electrically connected to the image driving element.

7. The touch panel of claim 5, further comprising an image signal transmission module, wherein the image signal transmission module is electrically connected to the image driving element and transmits a driving signal to the image driving element, and the image signal transmission module overhangs the image driving circuit substrate from the circuit end.

8. A touch panel, comprising:

an image driving circuit substrate, having a circuit end and a non-circuit end, wherein the circuit end and the non-circuit end are adjacent to each other and are arranged in an L shape at adjacent edges of the image driving circuit substrate, and an image driving element is disposed on an inner surface of the image driving circuit substrate near the circuit end for controlling an image driving circuit;

a display substrate, disposed over the image driving circuit substrate, the display substrate having a first end corresponding to the non-circuit end and overhanging the non-circuit end, and a second end corresponding to an end opposite to the non-circuit end, wherein the first end and the second end are opposite each other at opposing ends of the display substrate, the display substrate having a protruding part corresponding to the first end protruding beyond the non-circuit end, and the image driving circuit substrate having a protruding part corresponding to the circuit end protruding from one end adjacent to the first end;

a display media layer disposed between the image driving circuit substrate and the display substrate wherein an end of the display media layer is aligned with the non-circuit end and another end of the display media layer is aligned with the second end;

a touch sensing circuit disposed on an inner surface of the display substrate to coincide with the first end and the second end of the display substrate and disposed between the display media layer and the display substrate; and a touch sensing processor electrically connected to the touch sensing circuit, wherein the touch sensing processor is disposed on the protruding part of the display substrate and an inner surface of the touch sensing circuit.

9. The touch panel of claim 8, further comprising a color filter layer disposed on the inner surface of the display substrate, the touch sensing circuit is disposed between the color filter layer and the display substrate.

10. The touch panel of claim 8, wherein the touch sensing circuit comprises a capacitive touch sensing circuit, a resistive touch sensing circuit, an surface acoustic wave touch sensing circuit, or an infrared touch sensing circuit.

11. The touch panel of claim 8, further comprising a position signal transmission module electrically connected to the touch sensing processor, the position signal transmission module receiving and transmitting a position signal from the touch sensing processor, wherein the position signal transmission module overhanges the display substrate.

12. The touch panel of claim 8, wherein the image driving element is electrically connected with the image driving circuit substrate, the circuit end overhangs one end adjacent to the second end, and the image driving element is disposed on the image driving circuit substrate near the circuit end.

13. The touch panel of claim 12, wherein the image driving circuit substrate has the image driving circuit disposed thereon and electrically connected to the image driving element.

14. The touch panel of claim 12, further comprising an image signal transmission module, wherein the image signal transmission module is electrically connected to the image driving element and transmits a driving signal to the image driving element, and the image signal transmission module overhangs the image driving circuit substrate from the circuit end.

15. The touch panel of claim 8, wherein the display media layer is a liquid crystal layer or an organic light emitting diode layer.

* * * * *